Patented June 9, 1925.

1,541,220

UNITED STATES PATENT OFFICE.

OTIS HUTCHINS, OF NIAGARA FALLS, NEW YORK, ASSIGNOR TO THE CARBORUNDUM COMPANY, OF NIAGARA FALLS, NEW YORK, A CORPORATION OF PENNSYLVANIA.

ANTISLIP MATERIAL.

No Drawing.    Application filed June 28, 1922.   Serial No. 571,571.

*To all whom it may concern:*

Be it known that I, OTIS HUTCHINS, a citizen of the United States, residing at Niagara Falls, in the county of Niagara and State of New York, have invented a new and useful Improvement in Antislip Material, of which the following is a full, clear, and exact description.

My invention relates to the manufacture of antislip material to be used in antislip floors or treads. The object of the invention is to provide abrasive fragments of a type which will resist the tendency to work out of their setting or matrix and yet give the antislip qualities desired in the tread or floor surface.

In my copending application, Serial No. 572,727, filed July 3, 1922, I describe a method of making porous alumina fragments, which fragments I have found to possess the highly desirable characteristics for antislip floors and treads.

In making these fragments, as set forth in said application, I preferably melt aluminous material in an electric furnace of the arc type, tap out the material while gases of reduction are being evolved, and quench the material as it is tapped out, practically instantaneously by water. The material thus formed is of a highly porous honeycomb nature containing pore cells of a spheroidal character separated from each other by very thin walls or partitions. The alumina crystals in the material thus produced are extremely small in size, being generally not over .005 inch in diameter. I have found that fragments of this material are extremely efficient in antislip floor treads and surfaces. The material has a porosity of 35 per cent or more and the pore cells are of relatively greater size than the alumina crystals, these cells varying in size from one-fourth of an inch or more down to less than one-hundredth of an inch.

The fragments adhere strongly to the cement or matrix and yet are of a structure that under wear will present sufficient sharp abrasive points to maintain the antislip properties. The porous character gives a strong tie between the matrix material and the fragments. They may be used in all types of floors; for example, in terrazzo flooring, with or without marble chips and with Portland cement. The surface may be ground and polished or not, as desired. The fragments may also be used in the manufacture of tile, using a vitrified binder, and are well adapted for all kinds of bonding agents used in flooring constructions, such as magnesium oxychloride, ceramic bonds, rubber bonds, and the like.

The advantages of my invention will be obvious to those skilled in the art. The material may be cheaply made, as it only requires crushing to the desired size after being taken out of the furnace and quenched. Its peculiar porous character gives a strong bond with the matrix material, while at the same time it maintains its antislip properties. I have used the crushed material ranging from three-eighths of an inch to one-sixteenth of an inch, and mixed it in cement sidewalks and ordinary pavements with the regular mixture of cemented aggregates in proportions of from ten to thirty per cent, or even higher.

It is especially useful in the production of terrazzo tile and terrazzo flooring. Here, the abrasive material may be graded in sizes ranging from one-half inch to one-eighth inch and mixed with a cementing material, such as Portland cement, either with or without the addition of marble or other stone chips. A wash of Portland cement may be flushed over the surface after grinding, and this wash may be again polished and rubbed down.

Changes may be made in the size of the fragments, in the material of the mix and product etc., without departing from my invention.

I claim:

1. An antislip floor or tread having embedded therein fragments of aluminous abrasive material having a porosity greater than 25 per cent.

2. An antislip floor or tread surface having cement with fragments embedded therein, said fragments being broken portions of fused alumina masses having a porosity of at least 25 per cent.

3. An antislip floor or tread having embedded therein fragments of fused alumina containing spheroidal pores of relatively greater size than the alumina crystals of the fragments.

4. An antislip floor or tread surface of cement with fragments embedded therein of fused and quenched alumina masses having a highly porous honeycomb structure containing cells of spheroidal character separated from each other by very thin partitions.

5. An antislip floor or tread surface having imbedded therein fragments of fused aluminous abrasive material at least $\frac{1}{16}''$ in diameter and having a porosity greater than twenty-five per cent, said fragments being bonded by a suitable bonding material.

In testimony whereof I have hereunto set my hand.

OTIS HUTCHINS.